United States Patent [19]
Tanaka et al.

[11] Patent Number: 6,139,997
[45] Date of Patent: Oct. 31, 2000

[54] ELECTROPHOTOGRAPHIC PHOTOSENSITIVE MEMBER, PROCESS CARTRIDGE AND ELECTROPHOTOGRAPHIC APPARATUS

[75] Inventors: Masato Tanaka, Shizuoka-ken; Kouichi Nakata, Numazu, both of Japan

[73] Assignee: Canon Kabushiki Kaisha, Tokyo, Japan

[21] Appl. No.: 09/263,077

[22] Filed: Mar. 8, 1999

[30] Foreign Application Priority Data

| Mar. 6, 1998 | [JP] | Japan | 10-071206 |
| Mar. 6, 1998 | [JP] | Japan | 10-071207 |
| Mar. 9, 1998 | [JP] | Japan | 10-073013 |
| Mar. 24, 1998 | [JP] | Japan | 10-093928 |

[51] Int. Cl.$^7$ ..................... G03G 5/06
[52] U.S. Cl. ............... 430/56; 430/72; 430/76; 430/79
[58] Field of Search ............... 430/59.2, 59.3, 430/56, 72, 76, 79; 399/159, 116

[56] References Cited

U.S. PATENT DOCUMENTS

| 5,194,353 | 3/1993 | Tanaka et al. | 430/57 |
| 5,629,116 | 5/1997 | Kashizaki et al. | 430/58 |
| 6,040,100 | 3/2000 | Tanaka et al. | 430/72 |

FOREIGN PATENT DOCUMENTS

| 0322823 | 7/1989 | European Pat. Off. . |
| 0 451844 | 10/1991 | European Pat. Off. . |
| 0 628881 | 12/1994 | European Pat. Off. . |
| 47-37543 | 12/1972 | Japan . |
| 53-132347 | 11/1978 | Japan . |
| 54-022834 | 2/1979 | Japan . |
| 58-070232 | 4/1983 | Japan . |
| 60-131539 | 7/1985 | Japan . |
| 62-002267 | 1/1987 | Japan . |
| 62-192747 | 8/1987 | Japan . |
| 63-262656 | 10/1988 | Japan . |
| 63-264762 | 11/1988 | Japan . |
| 1-180554 | 7/1989 | Japan . |
| 8-227166 | 9/1996 | Japan | 430/56 |

*Primary Examiner*—Christopher D. Rodee
*Attorney, Agent, or Firm*—Fitzpatrick, Cella, Harper & Scinto

[57] ABSTRACT

An electrophotographic photosensitive member is formed of a support, and a photosensitive layer disposed on the support. The photosensitive layer is characterized by containing an azo pigment having an organic group represented by formula (1) below:

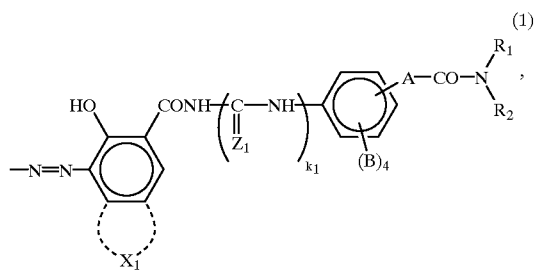

wherein $X_1$, $Z_1$, $k_1$, B, A, $R_1$ and $R_2$ are defined in the text. The group of the formula (1) may provide at least one of up to 4 azo-substituents of the azo pigment having an entire structure represented by Ar—(N=N—Cp) 1-4, wherein Ar denotes an aromatic or heterocyclic core unit, Cp denotes a coupler residue group, and —(N=N—Cp) denotes such an azo-substituent. The photosensitive member can exhibit good electro-photographic performances including high and stable sensitivity on repetitive use.

17 Claims, 1 Drawing Sheet

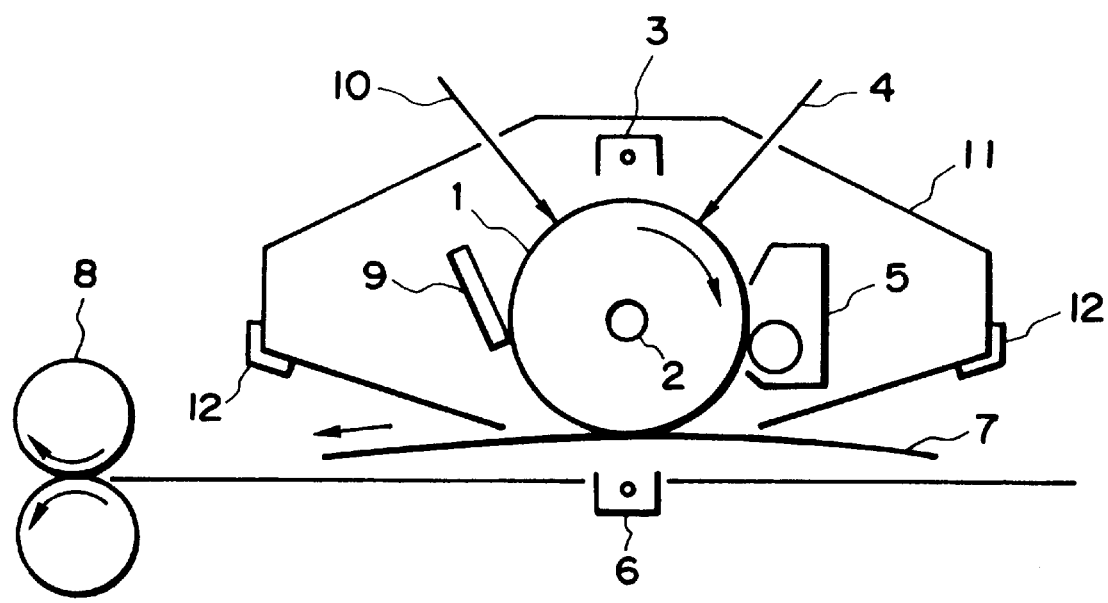

ELECTROPHOTOGRAPHIC PHOTOSENSITIVE MEMBER, PROCESS CARTRIDGE AND ELECTROPHOTOGRAPHIC APPARATUS

FIELD OF THE INVENTION AND RELATED ART

The present invention relates to an electrophotographic photosensitive member containing a photoconductive substance of a specific structure, and a process cartridge and an electrophotographic apparatus equipped with the electrophotographic photosensitive member.

Hitherto, inorganic photoconductive substances, such as selenium, cadmium sulfide and zinc oxide, have been extensively used as photoconductive substances for use in electrophotographic photosensitive members. On the other hand, an electrophotographic photosensitive member using an organic photoconductive substance has an advantage that it provides an extremely good productivity because of good film-formability of the organic photoconductive substance allowing the production by wet-coating, thus providing an inexpensive electrophotographic photosensitive member. Further, such an organic photosensitive member also has an advantage that the sensitive wavelength region can be arbitrarily controlled by selection of a dye or pigment used as the photoconductive substance, and therefore has been extensively studied heretofore.

Particularly, in recent years, function separation-type photosensitive members comprising lamination of charge generation layer containing an organic photoconductive dye or pigment and a charge transport layer comprising a photoconductive polymer and a low-molecular weight photoconductive substance, have been developed to provide remarkable improvements in sensitivity and durability which have been regarded as defects of conventional organic electrophotographic photosensitive members.

It is known that azo pigments exhibit excellent photoconductivity, and compounds having various properties can be easily obtained by selective combination of an azo component and a coupler component. Accordingly, a large number of compounds have been proposed heretofore. Examples of such azo pigment compounds are disclosed in, e.g., Japanese Laid-Open Patent Application (JP-A) 47-37543, JP-A 53-132347, JP-A 54-22834, JP-A 58-70232, JP-A 60-131539, JP-A 62-2267, JP-A 62-192747, JP-A 63-262656, JP-A 63-264762 and JP-A 1-180554.

However, conventional electrophotographic photosensitive members using azo pigments are not necessarily sufficient with respect to sensitivity and potential stability on repetitive use, so that only a few materials have been commercialized.

SUMMARY OF THE INVENTION

A generic object of the present invention is to provide a novel electrophotographic photosensitive member.

A more specific object of the present invention is to provide an electrophotographic photosensitive member having practically high sensitivity and stable potential characteristic on repetitive use.

Another object of the present invention is to provide a process cartridge and an electrophotographic apparatus using the electrophotographic photosensitive member.

According to the present invention, there is provided an electrophotographic photosensitive member, comprising a support, and a photosensitive layer disposed on the support; said photosensitive layer containing an azo pigment having an organic group represented by formula (1) below:

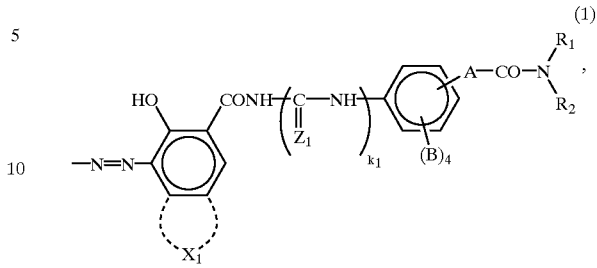

wherein $X_1$ is a group bonded to the benzene ring in the formula (1) to form a substituted or unsubstituted condensed hydrocarbon ring or substituted or unsubstituted condensed heterocyclic ring; each B independently denotes a hydrogen atom, halogen atom, nitro group, cyano group, carboxyl group, alkoxycarbonyl group, substituted or unsubstituted alkyl group, substituted or unsubstituted aralkyl group, or substituted or unsubstituted alkoxy group; $R_1$ and $R_2$ independently denote a hydrogen atom, a substituted or unsubstituted alkyl group, a substituted or unsubstituted aralkyl group, a substituted or unsubstituted aryl group, a substituted or unsubstituted heterocyclic group, or a group forming a substituted or unsubstituted cyclic amino group by a combination of the groups $R_1$ and $R_2$ together with the nitrogen (N) atom in the formula (1); $Z_1$ denotes an oxygen atom or sulfur atom; $k_1$ is 0 or 1; A denotes a substituted or unsubstituted alkylene group, substituted or unsubstituted alkenylene group, $—R_3—CO—$ or $—(CONH)_{k2}$; $R_3$ denotes a substituted or unsubstituted alkylene group; and $k_2$ is 0 or 1 providing $k_1$ and $k_2$ are not simultaneously 0.

The present invention further provides a process cartridge and an electrophotographic apparatus respectively including the above-mentioned electrophotographic photosensitive member.

These and other objects, features and advantages of the present invention will become more apparent upon a consideration of the following description of the preferred embodiments of the present invention taken in conjunction with the accompanying drawing.

BRIEF DESCRIPTION OF THE DRAWING

The sole FIGURE in the drawing is a schematic illustration of an electrophotographic apparatus including a process cartridge which in turn includes an embodiment of the electrophotographic photosensitive member according to the invention.

DETAILED DESCRIPTION OF THE INVENTION

As described above, the electrophotographic photosensitive member according to the present invention comprises a support and a photosensitive layer disposed on the support, and the photosensitive layer is characterized by containing an azo pigment having an organic group represented by formula (1) below:

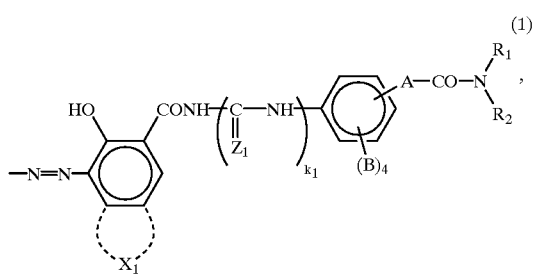

wherein $X_1$ is a group bonded to the benzene ring in the formula (1) to form a substituted or unsubstituted condensed hydrocarbon ring or substituted or unsubstituted condensed heterocyclic ring; each B independently denotes a hydrogen atom, halogen atom, nitro group, cyano group, carboxyl group, alkoxycarbonyl group, substituted or unsubstituted alkyl group, substituted or unsubstituted aralkyl group, or substituted or unsubstituted alkoxy group; $R_1$ and $R_2$ independently denote a hydrogen atom, a substituted or unsubstituted alkyl group, a substituted or unsubstituted aralkyl group, a substituted or unsubstituted aryl group, a substituted or unsubstituted heterocyclic group, or a group forming a substituted or unsubstituted cyclic amino group by a combination of the groups $R_1$ and $R_2$ together with the nitrogen (N) atom in the formula (1); $Z_1$ denotes an oxygen atom or sulfur atom; $k_1$ is 0 or 1; A denotes a substituted or unsubstituted alkylene group, substituted or unsubstituted alkenylene group, —$R_3$—CO— or —(CONH$)_{k_2}$; $R_3$ denotes a substituted or unsubstituted alkylene group; and $k_2$ is 0 or 1.

Examples of the condensed hydrocarbon ring or heterocyclic ring optionally having a substituent formed by a combination the group $X_1$ and the benzene ring in the formula (1) may include: substituted or unsubstituted naphthalene ring, substituted or unsubstituted anthracene ring, substituted or unsubstituted carbazole ring, substituted or unsubstituted benzocarbazole ring, substituted or unsubstituted dibenzofuran ring, substituted or unsubstituted benzonaphthofuran ring, substituted or unsubstituted diphenylene sulfite ring, substituted or unsubstituted quinoline ring, substituted or unsubstituted isoquinoline ring, and substituted or unsubstituted acridine ring.

Examples of the substituent optionally possessed by the group $X_1$ may include: alkyl group, such as methyl, ethyl, propyl and butyl; alkoxy groups, such as methoxy and ethoxy; halogen atoms, such as fluorine, chlorine, bromine, and iodine; alkylamino groups, such as dimethylamino and diethylamino; phenylcarbamoyl, nitro, cyano, hydroxyl, and halomethyl groups, such as trifluoromethyl.

Each substituent B may independently be a hydrogen atom; a halogen atom, such as fluorine, chlorine, bromine, or iodine; nitro, cyano, carboxyl; alkoxycarbonyl, such as methoxycarbonyl, or ethoxy carbonyl; substituted or unsubstituted alkyl group, such as methyl, ethyl or propyl; substituted or unsubstituted aralkyl group, such as benzyl or phenethyl; or substituted or unsubstituted alkoxy group, such as methoxy, ethoxy or propoxy.

Examples of the substituent optionally possessed by the group B may include: alkyl group, such as methyl, ethyl, propyl and butyl; alkoxy groups such as methoxy and ethoxy; halogen atoms, such as fluorine, chlorine, bromine, and iodine; alkylamino groups, such as dimethylamino and diethylamino; phenylcarbamoyl, nitro, cyano, hydroxyl, and halomethyl groups, such as trifluoromethyl.

As for the groups RI and R2 in the formula (1), examples of the alkyl group may include methyl, ethyl, propyl and butyl; examples of the aralkyl group may include benzyl, phenetyl and naphthyl methyl; examples of the aryl group may include phenyl, biphenyl, naphthyl and anthryl; and examples of the heterocyclic group may include; pyridyl, thienyl, furyl, thiazolyl, carbazolyl, dibenzofuryl, benzoimidazolyl, and benzothiazolyl. Examples of the substituent optionally possessed by the above-mentioned alkyl group may include: halogen atoms, such as fluorine, chlorine, bromine and iodine; nitro group and cyano group. Examples of the substituent optionally possessed by the above-mentioned aralkyl group, aryl group and heterocyclic group may include: alkyl groups, such as methyl, ethyl and propyl; halogen atoms, such as fluorine, chlorine, bromine and iodine; alkylamino groups, such as dimethylamino and diethylamino; phenylcarbamoyl, nitro, cyano, and halomethyl groups, such as trifluoromethyl.

Examples of the cyclic amino group formed by the groups R1, R2 and the nitrogen (N) in the formula (1) may include: pyrrolyl, pyrrolinyl, pyrrolidinyl, indolyl, piperidinyl, piperazinyl, isoindolyl, carbazolyl, benzoindolyl, imidazolyl, pyrazolyl, pyrazolinyl, oxadinyl, phenoxadinyl and benzocarbolyl. Examples of the substituent optionally possessed by these cyclic amino groups may include: alkyl groups, such as methyl, ethyl and propyl; alkoxy groups, such as methoxy and ethoxy; halogen atoms, such as fluorine, chlorine, bromine and iodine; nitro, cyano and halo-methyl groups, such as trifluoromethyl.

As will be described hereinafter, R1 may preferably be a hydrogen atom so as to exhibit an interaction between pigment molecules owing to hydrogen-bonding capability. Further, in the case where R1 is hydrogen, R2 may preferably be a substituted or unsubstituted alkyl group, or substituted or unsubstituted aralkyl group, or substituted or unsubstituted aryl group. Among these, a substituted or unsubstituted aryl group is particularly preferred, and substituted or unsubstituted phenyl is most preferred.

As for the group A in the formula (1), examples of the alkylene group may include: methylene, ethylene and propylene; and examples of the alkenylene group may include: vinylene and propenylene. Examples of the substituent optionally possessed by the alkylene and alkenylene groups may include: halogen atoms, such as fluorine, chlorine, bromine and iodine, nitro group and cyano group.

As for the group $R_3$, examples of the alkylene group may include: methylene, ethylene and propylene. Examples of the substituent optionally possessed by the alkylene group may include: halogen atoms, such as fluorine, chlorine, bromine and iodine; nitro group and cyano group.

As a preferred combination, it is preferred that A is an alkylene group or alkenylene group selected from —$CH_2$—, —$CH_2CH_2$—, —$CH(CH_3)$—, —$CH_2CH_2CH_2$— and —CH=CH—; $R_3$ is —$CH_2$—, and all the four Bs are hydrogen atoms.

Alternatively, it is also preferred that Z is an oxygen atom when A is —(CONH$)_{k_2}$.

The azo pigment used in the present invention may preferably have an entire structure including a core unit to which the organic group of the formula (1) is bonded. The core unit includes at least one ring unit each comprising at least one of substituted or unsubstituted aromatic hydrocarbon rings and substituted or unsubstituted heterocyclic rings with the proviso that a plurality of such ring units can be bonded to each other via an intervening bonding group. Each ring unit may be composed of one ring or a plurality of fused rings. The core unit can comprise a single ring unit but may preferably comprise a plurality of such ring units bonded directly or via an intervening bonding group. The nature and examples of such an intervening bonding group will be understood from not a few preferred examples of the combinations of the ring units described below and the azo pigment enumerated hereinafter.

Examples of the ring units, i.e., (optionally substituted) aromatic hydrocarbon ring(s) and/or heterocyclic ring(s), may include: hydrocarbon rings, such as benzene, naphthalene, fluorene, phenanthrene, anthracene and pyrene; heterocyclic rings, such as furan, thiophene, pyridine, indole, benzothiazole, carbazole, acridone, dibenzothiophene, benzoxazole, oxadiazole, and thiazole; and combination of such hydrocarbon ring(s) and/or heterocyclic ring(s) bonded directly or via an aromatic group or non-aromatic group, such as biphenyl, binaphthyl, diphenylamine, triphenylamine, N-methyldiphenylamine, fluorenone, phenanthrenequinone, anthraquinone, benzanthrone, anthanthrone, terphenyl, diphenyloxadiazole, stilbene, distyrylbenzene, azobenzene, azoxybenzene, phenylbenzoxazole, diphenylmethane, diphenylsulfone, diphenyl ether, benzophenone, tetraphenyl-p-phenylenediamine, tetraphenylbenzidine, N-phenyl-2-pyridylamine, and N,N-diphenyl-2-pyridylamine.

Examples of the substituent optionally possessed by the aromatic hydrocarbon ring(s) and/or heterocyclic ring(s) may include: alkyl groups, such as methyl, ethyl, propyl and butyl; alkoxy groups, such as methoxy and ethoxy; dialkylamino groups, such as dimethylamino and diethylamino; halogen atoms, such as fluorine, chlorine, bromine and iodine; nitro, cyano and halo-methyl groups.

More specifically, the azo pigment used in the present invention may preferably have a structure represented by the following formula (2):

(2), wherein Ar denotes a core unit as described above including at least one ring unit each comprising at least one of substituted or unsubstituted aromatic hydrocarbon rings and substituted or unsubstituted heterocyclic rings with the proviso that a plurality of such ring units can be bonded to each other via an intervening bonding group; n is an integer of 1–4; and each Cp denotes a coupler residue group having a phenolic hydroxy group with the proviso that at least one of up to 4 Cp groups constitutes the organic group of the formula (1). In the present invention, it is preferred that n is at least 2, and n=2 is particularly preferred in view of the electrophotographic performances of the resultant photosensitive member.

Examples of the coupler groups Cp in the formula (2) other than that constituting the organic group of the formula (1) may include those of the following formula (3)–(17), while these are not exhaustive.

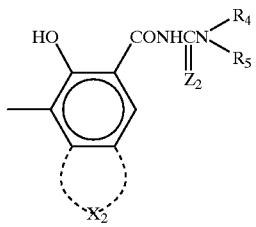

(3)

-continued

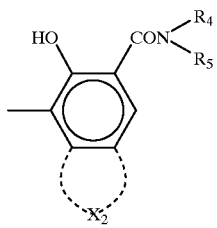

(4)

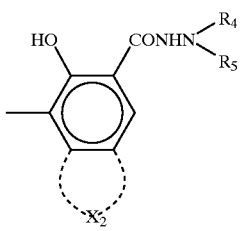

(5)

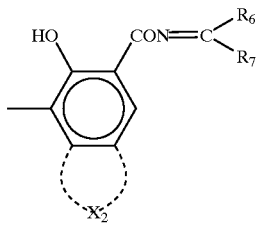

(6)

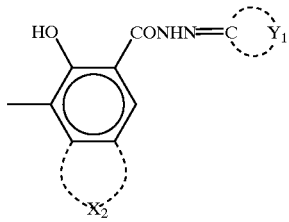

(7)

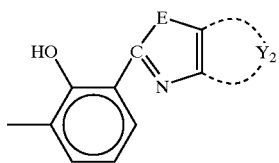

(8)

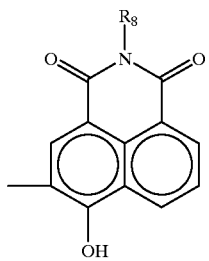

(9)

(10)
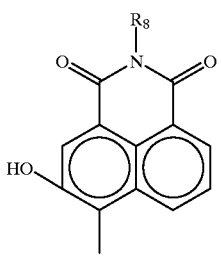

(11)
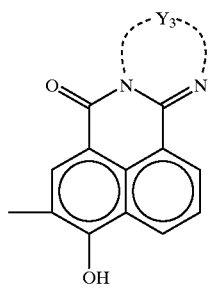

(12)
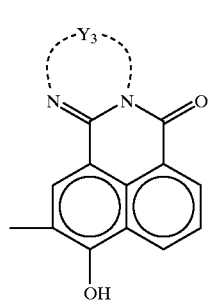

(13)
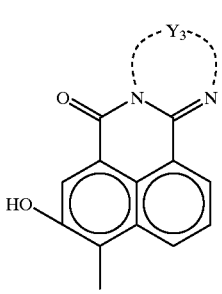

(14)
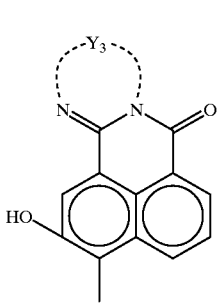

(15)
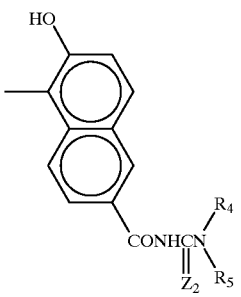

(16)
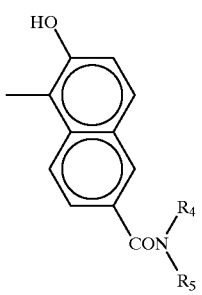

(17)
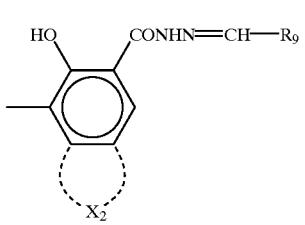

In the above formulae, $X_2$ represents an organic residue group condensed with the benzene ring to form an aromatic hydrocarbon ring or heterocyclic ring, such as a substituted or unsubstituted naphthalene ring, substituted or unsubstituted anthracene ring, substituted or unsubstituted carbazole ring, substituted or unsubstituted benzocarbazole ring, substituted or unsubstituted dibenzofuran ring, substituted or unsubstituted benzonaphthofuran ring, substituted or unsubstituted fluorenone ring, substituted or unsubstituted dibenzophenylene sulfite ring, substituted or unsubstituted quinoline ring, substituted or unsubstituted isoquinoline ring, or substituted or unsubstituted acridine ring;

$R_4$ and $R_5$ independently denote a hydrogen atom, a substituted or unsubstituted alkyl group, a substituted or unsubstituted aralkyl group, a substituted or unsubstituted aryl group, a substituted or unsubstituted heterocyclic group, or a group forming a substituted or unsubstituted cyclic amino group by combination of the groups $R_4$ and $R_5$ with the nitrogen in the formula concerned;

$R_6$ and $R_7$ independently denote a hydrogen atom, a substituted or unsubstituted alkyl group, a substituted or unsubstituted aralkyl group, a substituted or unsubstituted aryl group, or a substituted or unsubstituted heterocyclic group;

$R_8$ and $R_9$ independently denote a substituted or unsubstituted alkyl group, a substituted or unsubstituted aralkyl group, a substituted or unsubstituted aryl group, or a substituted or unsubstituted heretocyclic group;

Y1 denotes a divalent group forming a substituted or unsubstituted hydrocarbon ring group or heterocyclic group together with the carbon in the formula concerned with preferred examples of the hydrocarbon ring group or heterocyclic group of

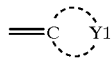

including the following:

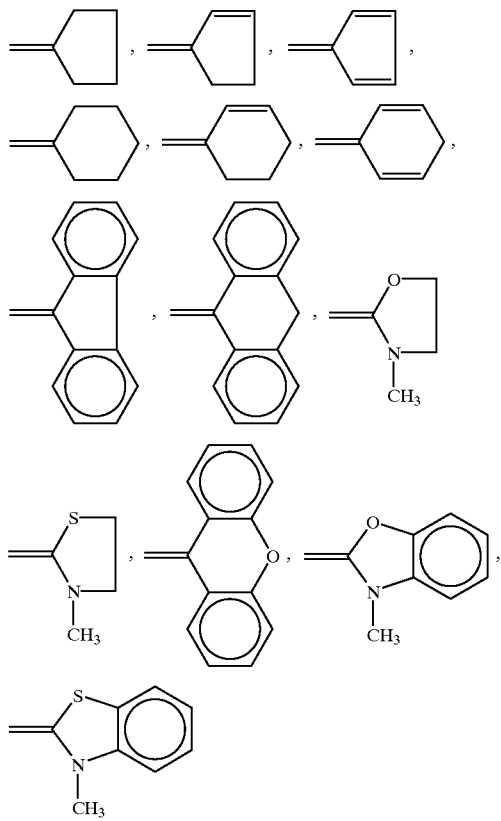

Y2 denotes a substituted or unsubstituted divalent aromatic hydrocarbon ring group, such as o-phenylene, o-naphthylene, peri-naphthylene, 1,2-anthrylene, or 9,10-phenanthrylene;

Y3 denotes a substituted or unsubstituted divalent aromatic hydrocarbon ring group or nitrogen-containing heterocyclic group with examples of the divalent aromatic hydrocarbon ring group including: o-phenylene, o-naphthylene, peri-naphthylene, 1,2-anthrylene and 9,10-phenanthrylene, and with examples of the divalent nitrogen-containing heterocyclic group including: 3,4-pyrazole-di-yl, 2,3-pyridine-di-yl, 4,5-pyridine-di-yl, 6,7-imidazole-di-yl, 5,6-benzimidazole-di-yl, and 6,7-quinoline-di-yl;

D denotes an oxygen atom, sulfur atom or N-substituted or unsubstituted imino group with examples of the N-substituent including: substituted or unsubstituted aralkyl group, substituted or unsubstituted aralkyl group, and substituted or unsubstituted aryl group such as phenyl and naphthyl; and Z2 is an oxygen atom or sulfur atom.

As for the groups R4 to R9 and D in the above formulae (3)–(17), examples of the alkyl group may include: methyl, ethyl and propyl; the aralkyl group: benzyl, phenethyl and naphthyl; the aryl group: phenyl, diphenyl, naphthyl and anthryl; the heterocyclic group: pyridyl, thienyl, furyl, thiazolyl, carbazolyl, dibenzofuryl, benzimidazolyl and benzothiazolyl; the nitrogen-containing cyclic amino group: those derived from the corresponding amines of pyrrole, pyrroline, pyrrolidine, pyrrolidone, indole, indaline, isoindole, carbazole, benzindole, imidazole, pyrazole, pyrazoline, oxadine, phenoxazine and benzcarbazole.

Further, examples of the optional substituents that may be contained the groups X2, R4–R9, Y1–Y3 and D may include: alkyl groups, such as methyl, ethyl, propyl and butyl; alkoxy groups, such as methoxy and ethoxy; halogen atoms, such as fluorine, chlorine, bromine and iodine; alkylamino groups, such as dimethylamino and diethylamino; phenylcarbamoyl, nitro, cyano and halo-methyl groups, such as trifluoromethyl.

Preferred examples of the azo pigment used in the present invention are enumerated hereinbelow with their example numbers each followed by its entire structural formula on the left side and structural formula of the coupler residue (Cp) in the entire structural formula on the right side.

Pigment (1)-1
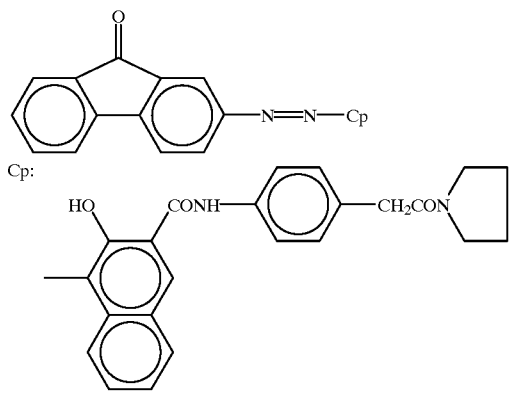
Pigment (1)-2
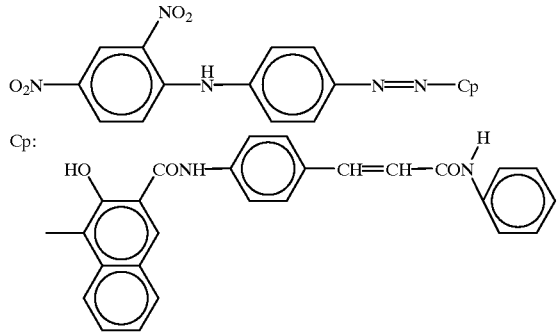
Pigment (1)-3
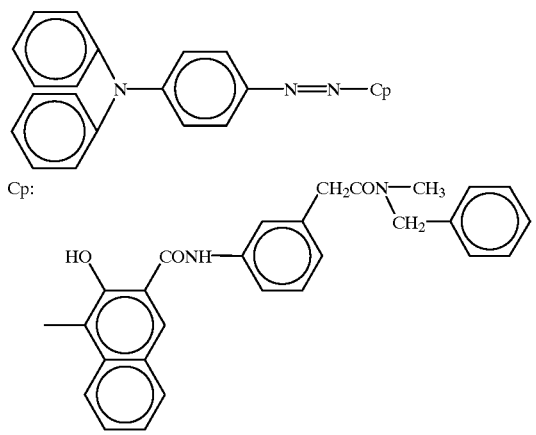
Pigment (1)-4
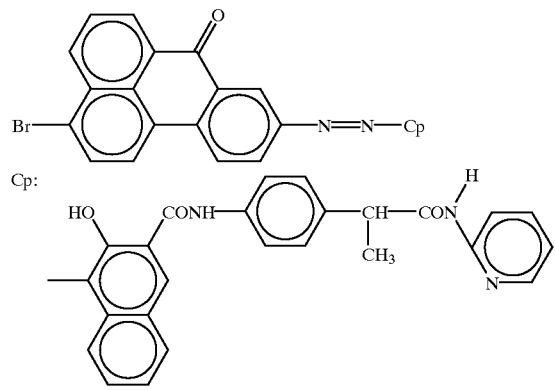
Pigment (2)-1
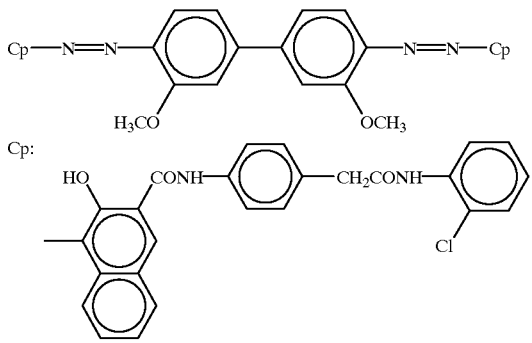
Pigment (2)-2
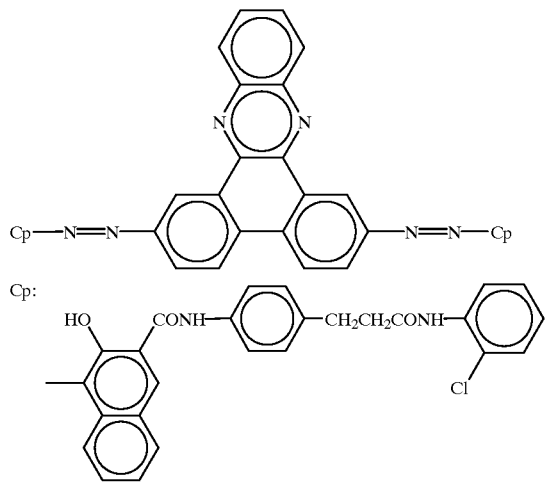

-continued
Pigment (2)-3
Structure: Same as the above
Cp:
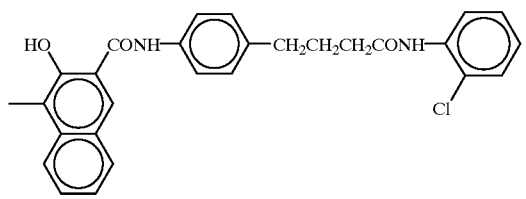
Pigment (2)-4
Structure: Same as the above
Cp:
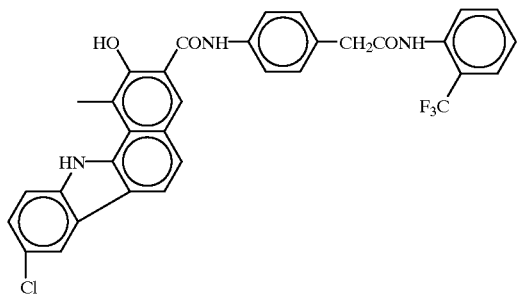
Pigment (2)-5
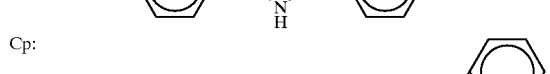
Cp:
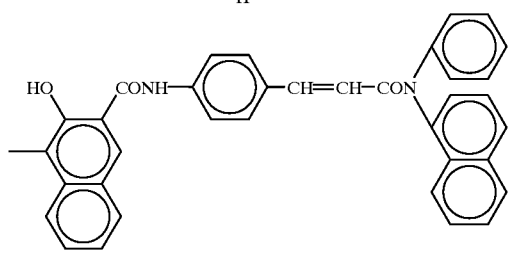
Pigment (2)-6
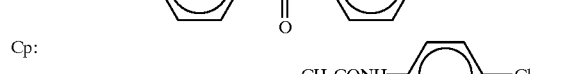
Cp:
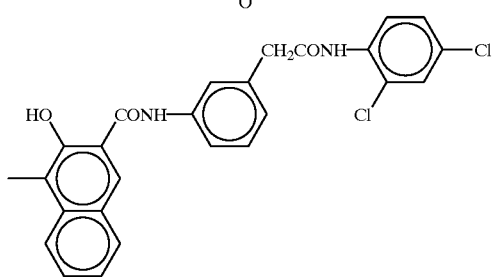
Pigment (2)-7
Structure: Same as the above
Cp:
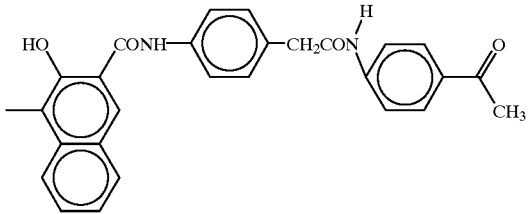
Pigment (2)-8
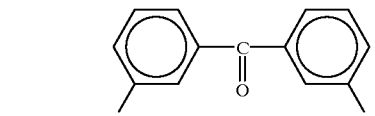
Cp:
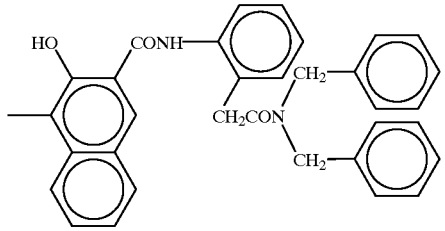

Pigment (2)-9
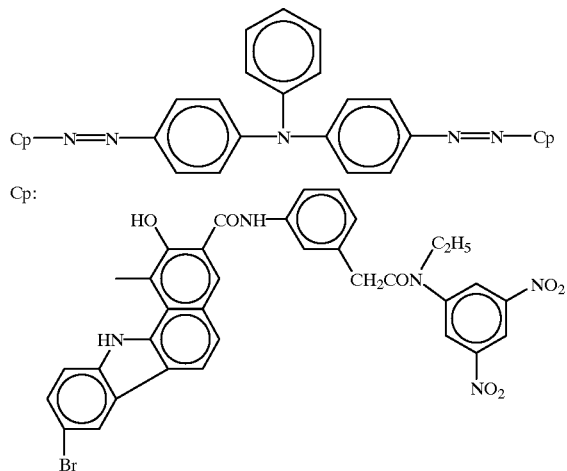
Pigment (2)-10
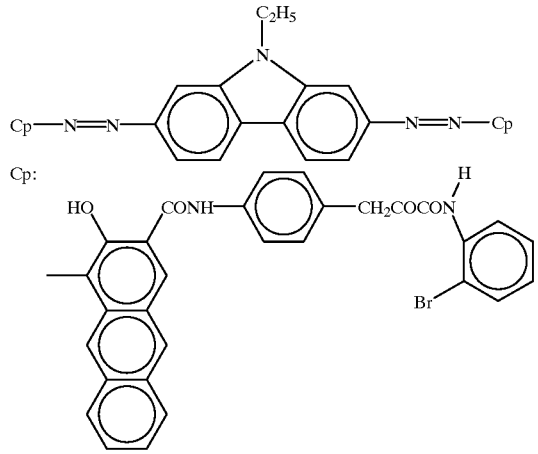
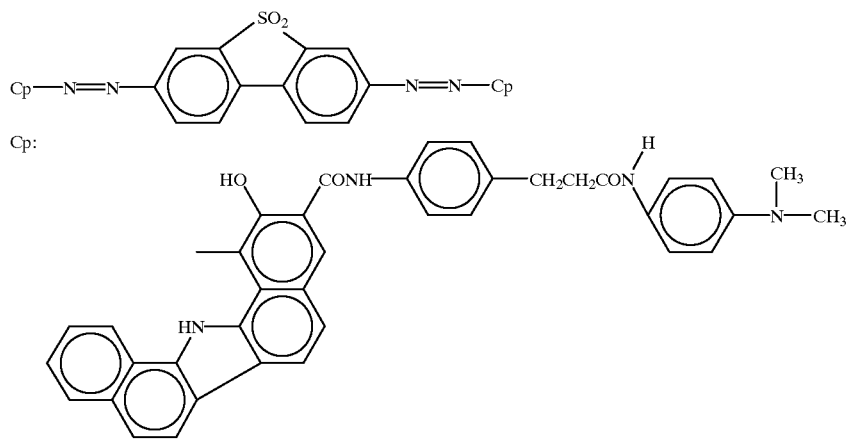
Pigment (2)-11
Pigment (2)-12
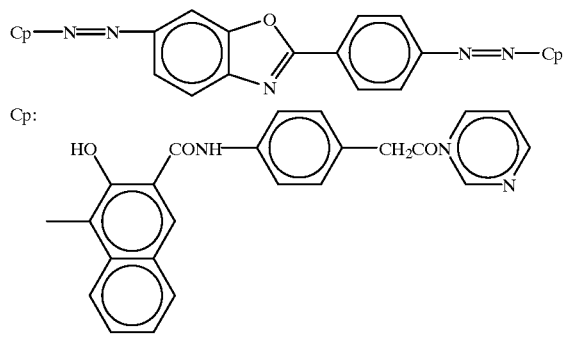

Pigment (2)-13
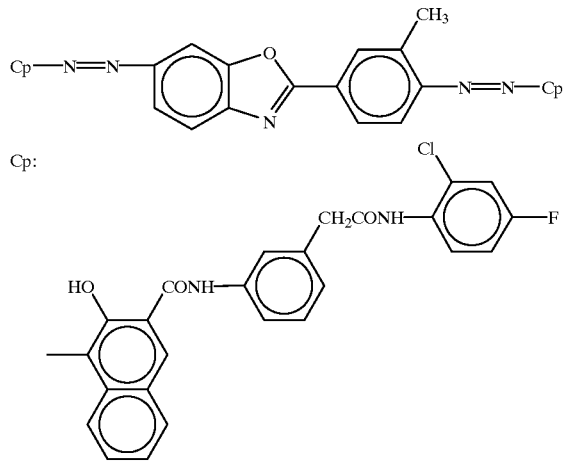
Pigment (2)-14
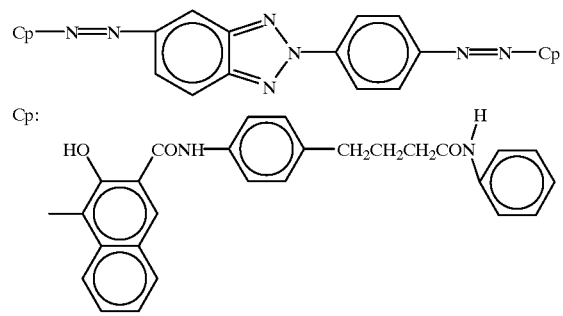
Pigment (2)-15
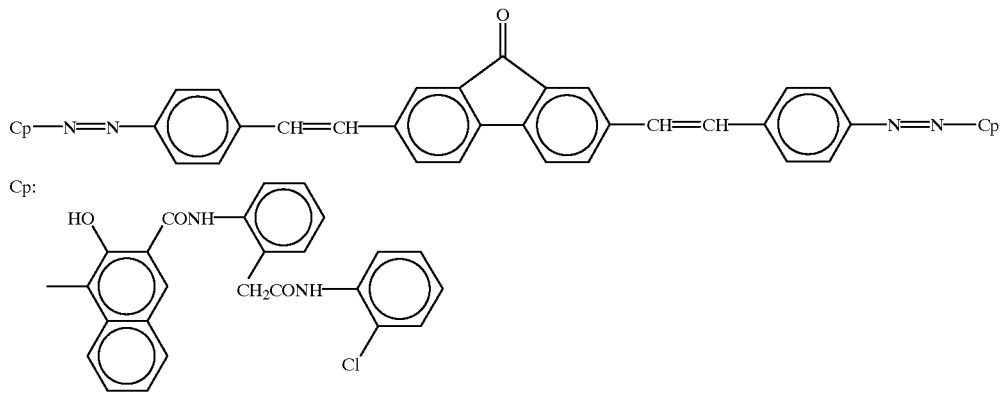
Pigment (2)-16
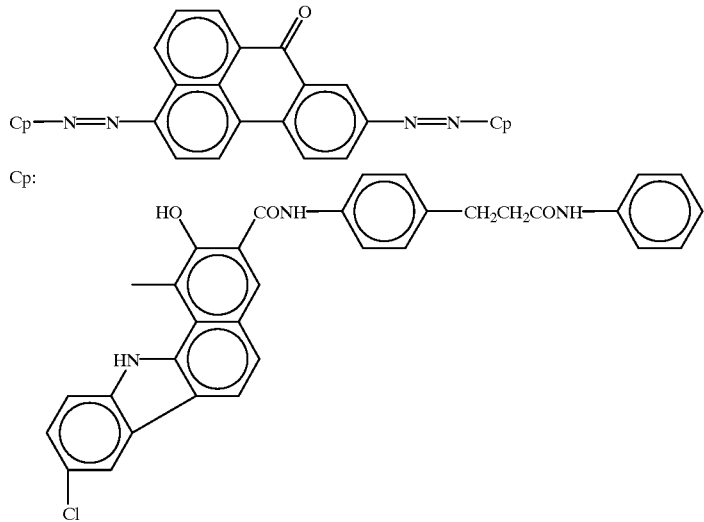

Pigment (2)-17
Structure: Same as the above
Cp:
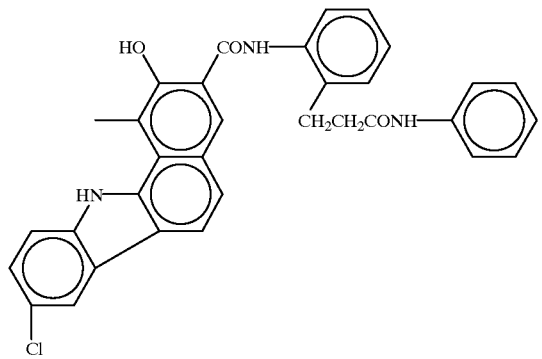
Pigment (2)-18
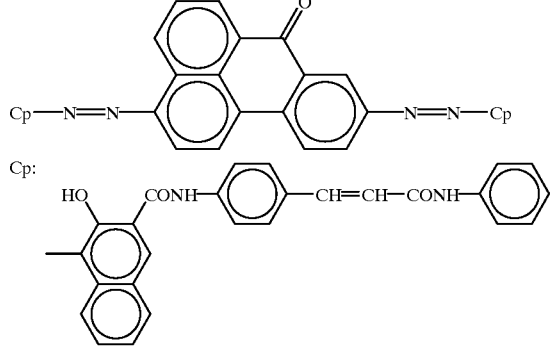
Cp:
Pigment (2)-19
Structure: Same as the above
Cp:
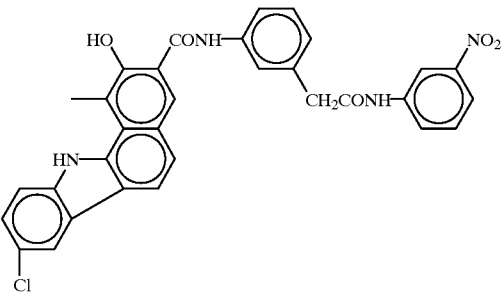
Pigment (2)-20
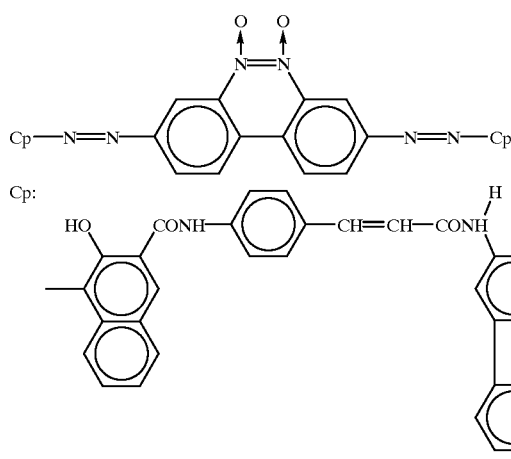
Cp:
Pigment (2)-21
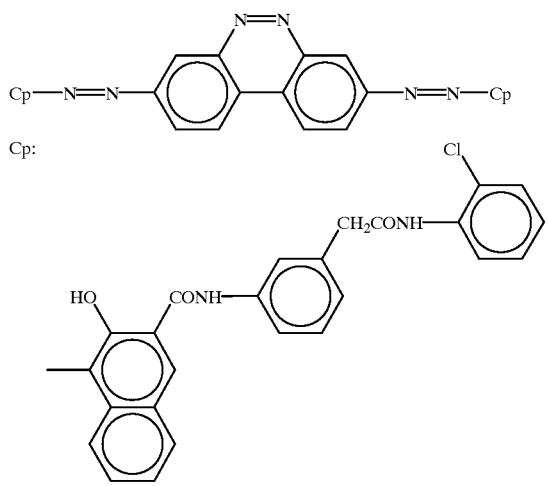
Cp:

Pigment (2)-22
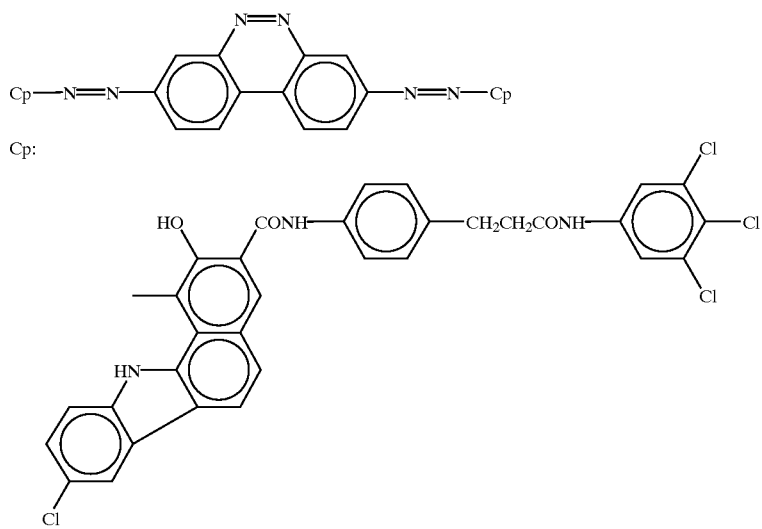
Pigment (2)-23
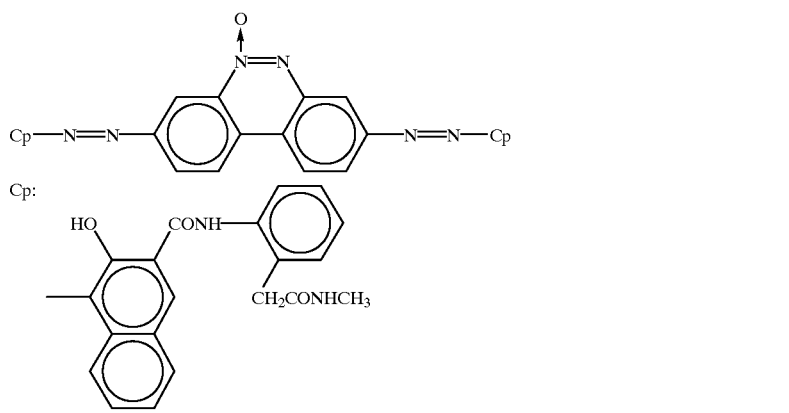
Pigment (2)-24
Structure: Same as the above
Cp:
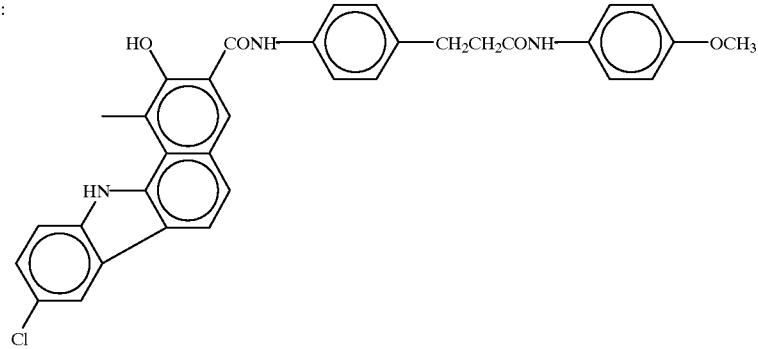

-continued
Pigment (2)-25
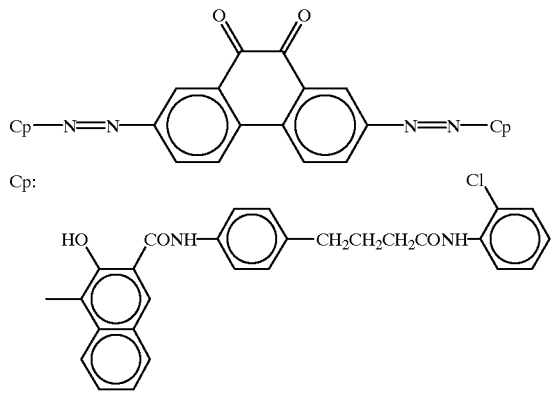
Structure: Same as the above
Cp:
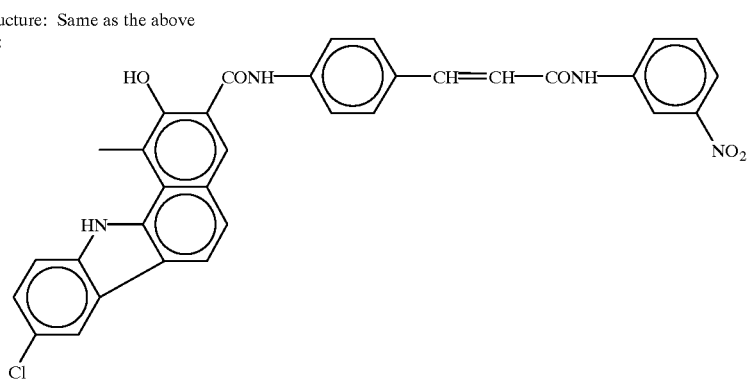
Pigment (2)-26
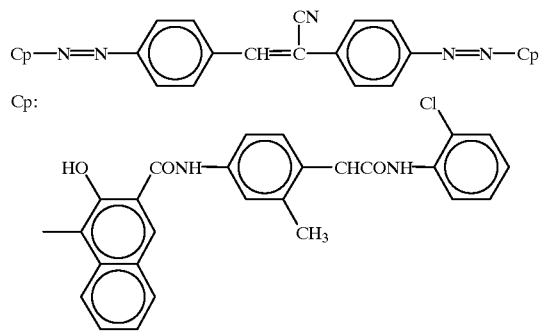
Pigment (2)-27
Pigment (2)-28
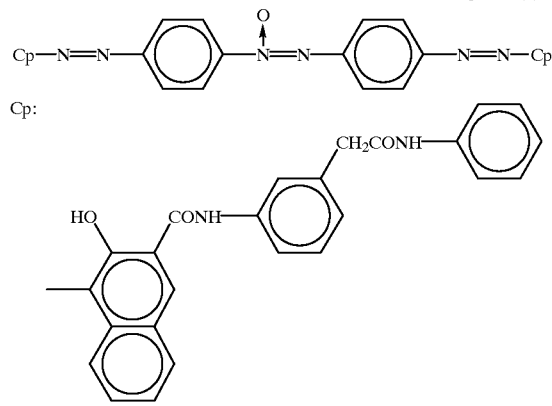
Pigment (2)-29
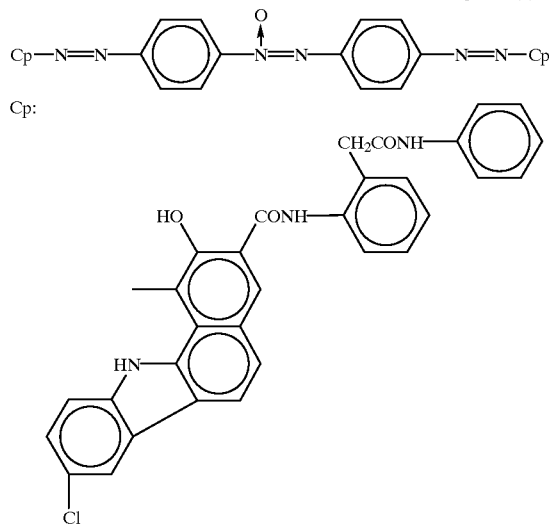

-continued
Pigment (2)-30
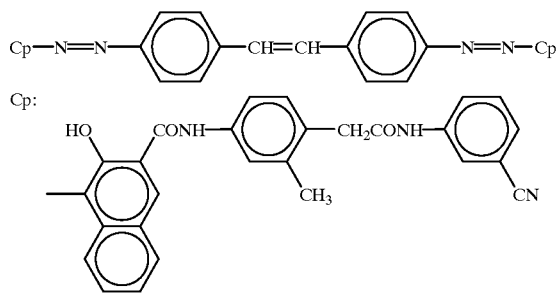
Pigment (2)-31
Structure: Same as the above
Cp:
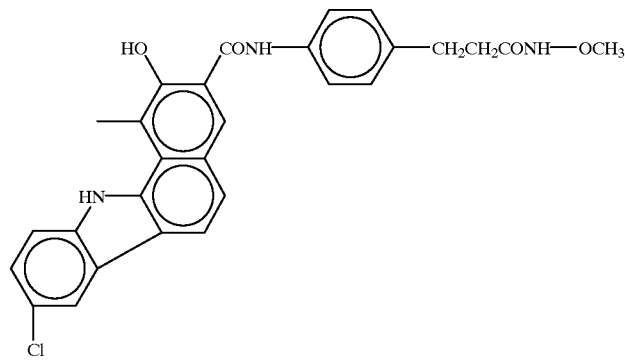
Pigment (2)-32
Structure: Same as the above
Cp:
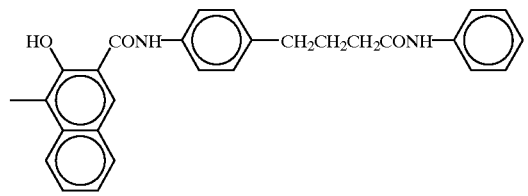
Pigment (2)-33
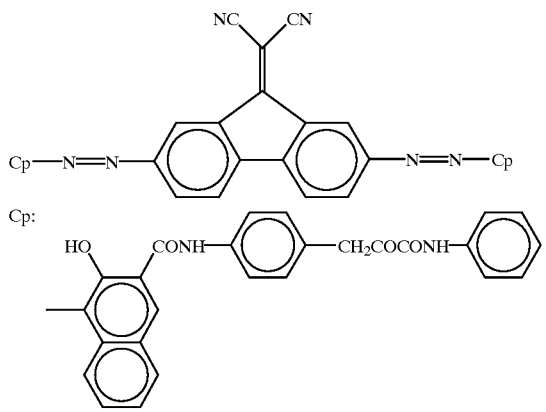
Cp:
Pigment (2)-34
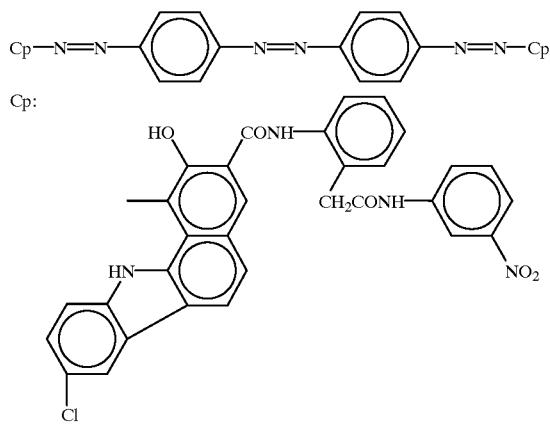
Pigment (2)-35
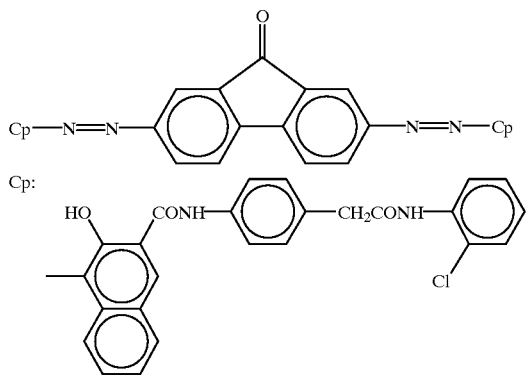
Cp:

-continued
Pigment (2)-36
Structure: Same as the above
Cp:
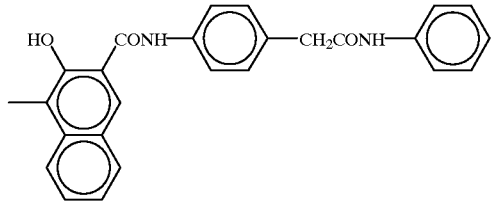
Pigment (2)-37
Cp:
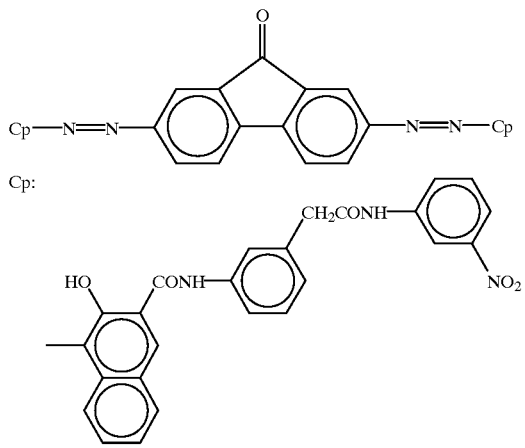
Pigment (2)-38
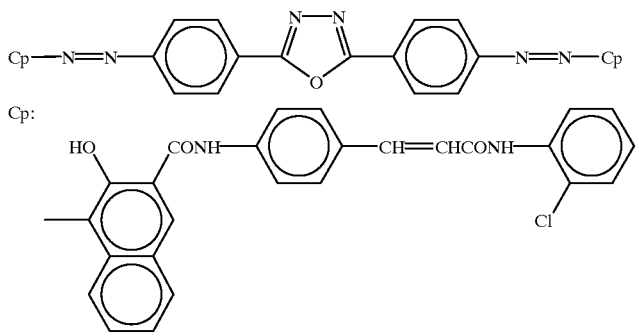
Pigment (2)-39
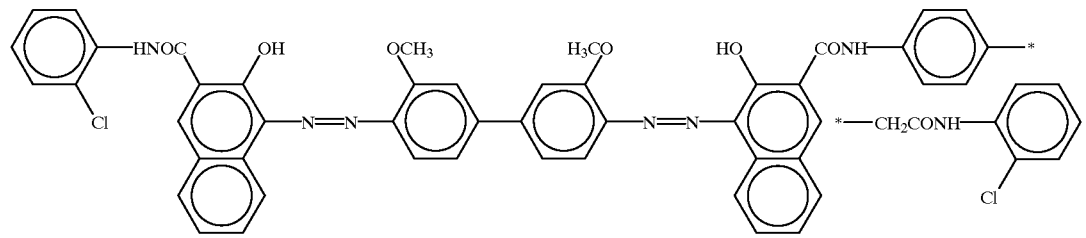
Pigment (2)-40
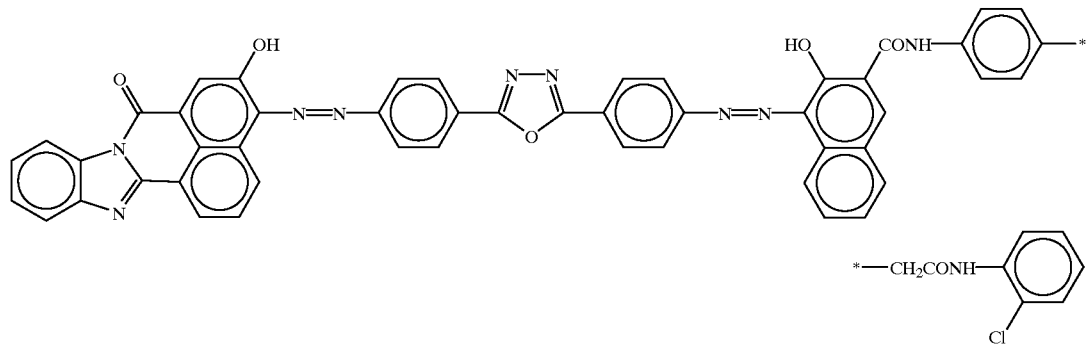

Pigment (2)-41
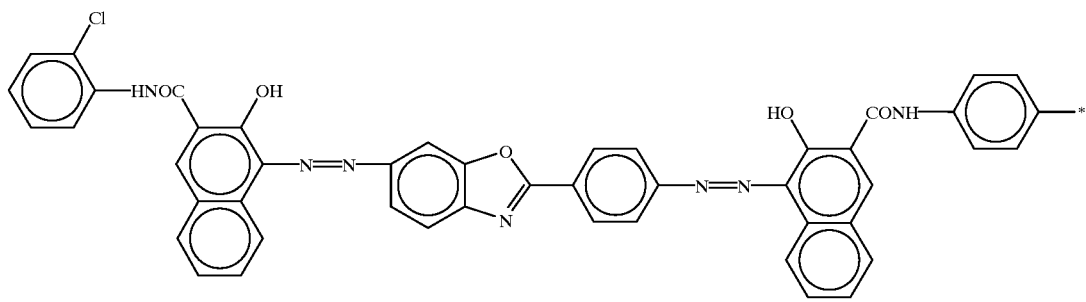
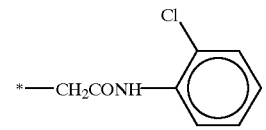
Pigment (2)-42
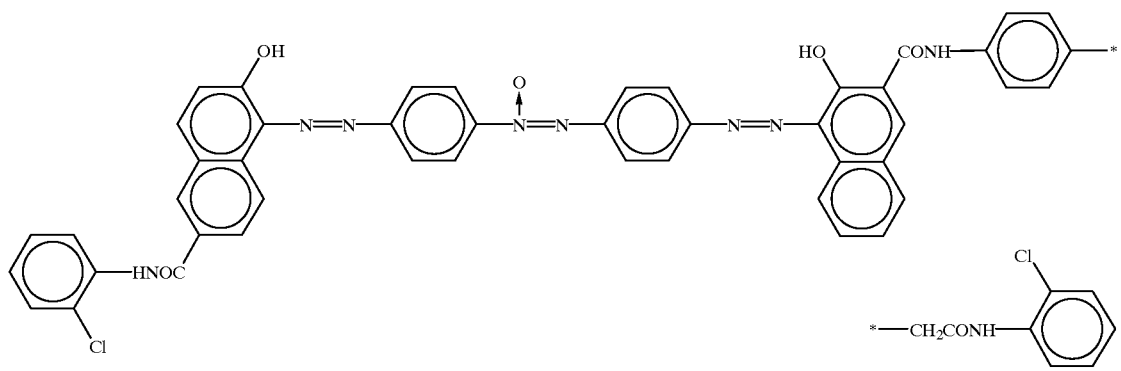
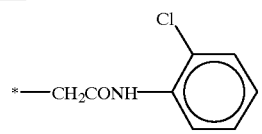
Pigment (2)-43
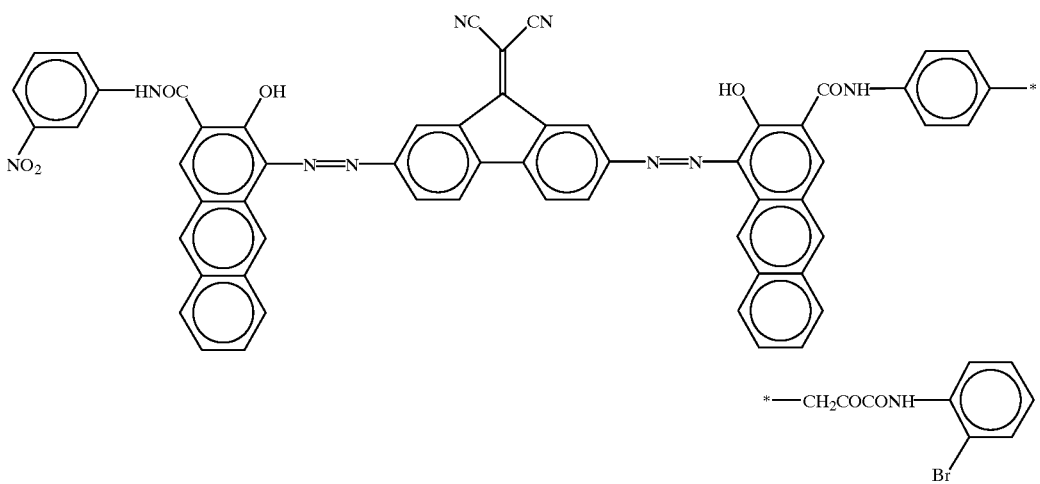
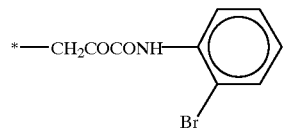

-continued
Pigment (3)-1
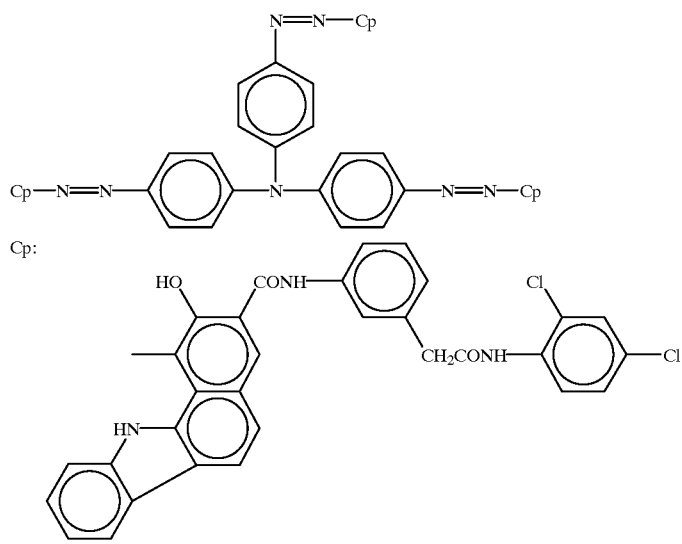
Cp:
Pigment (3)-2
Structure: Same as the above
Cp:
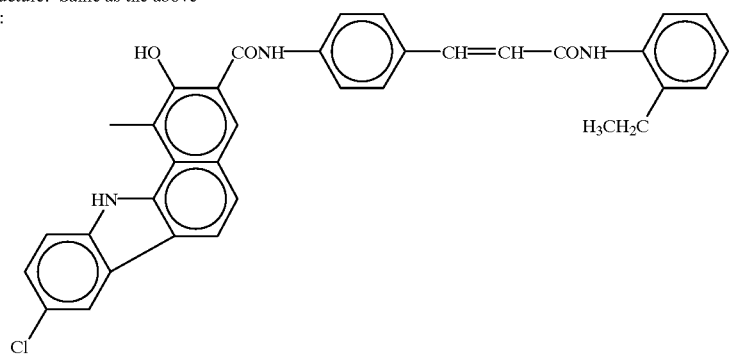
Pigment (3)-3
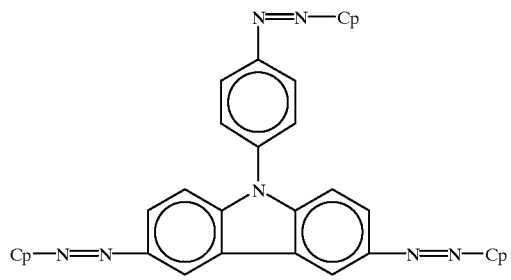
Cp:
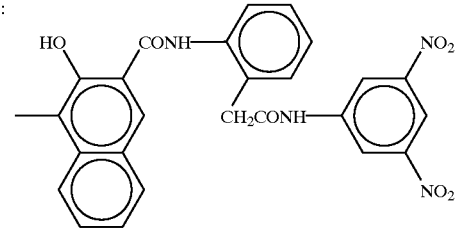

Pigment (3)-4
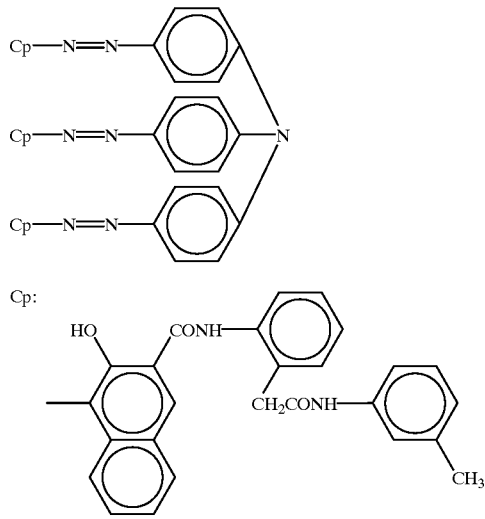
Pigment (3)-5
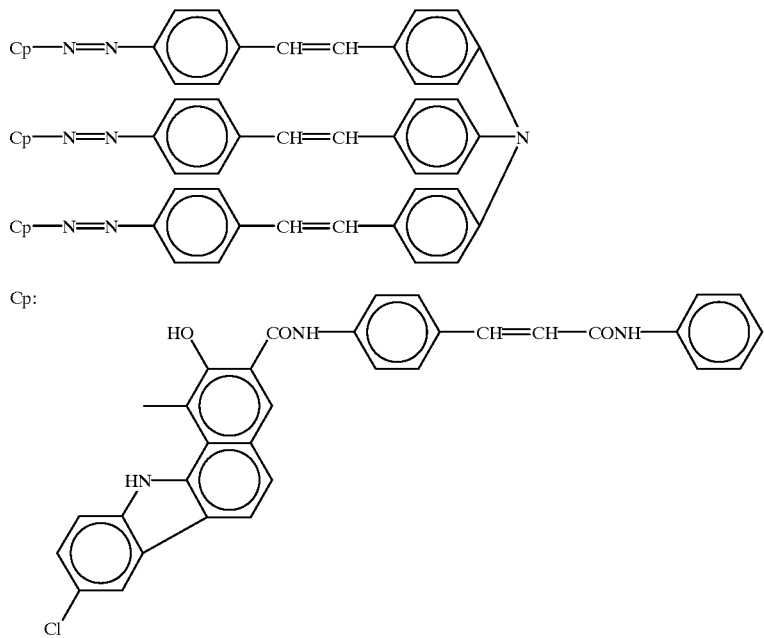
Pigment (3)-6
Structure: Same as the above
Cp:
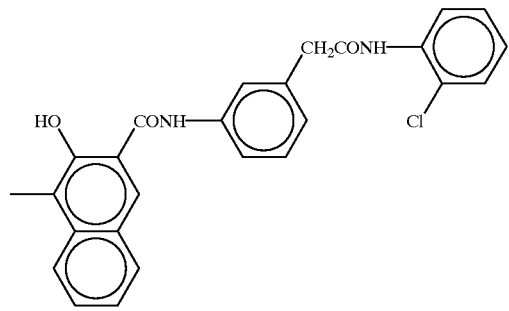

Pigment (3)-7
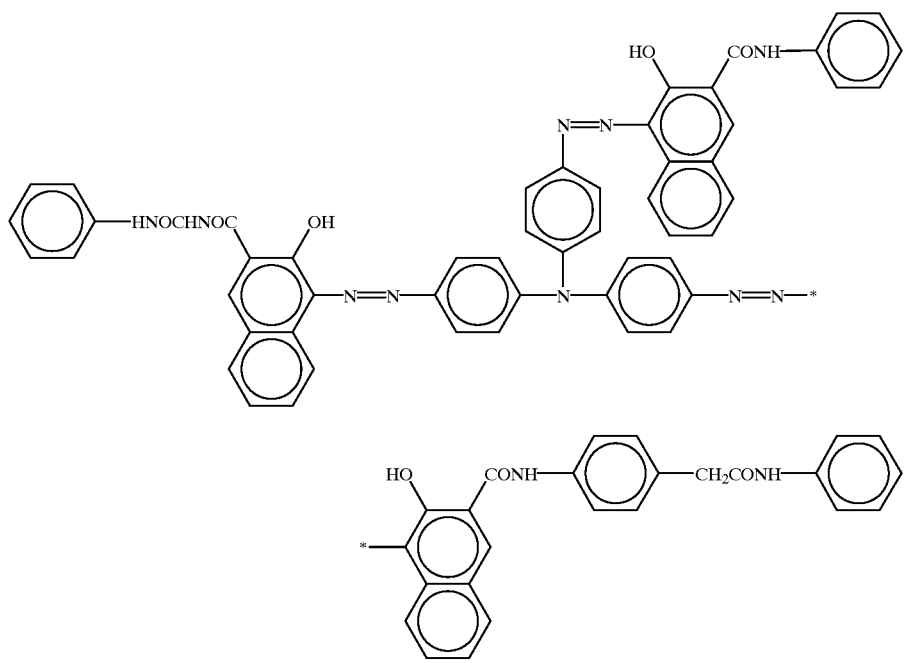
Pigment (3)-8
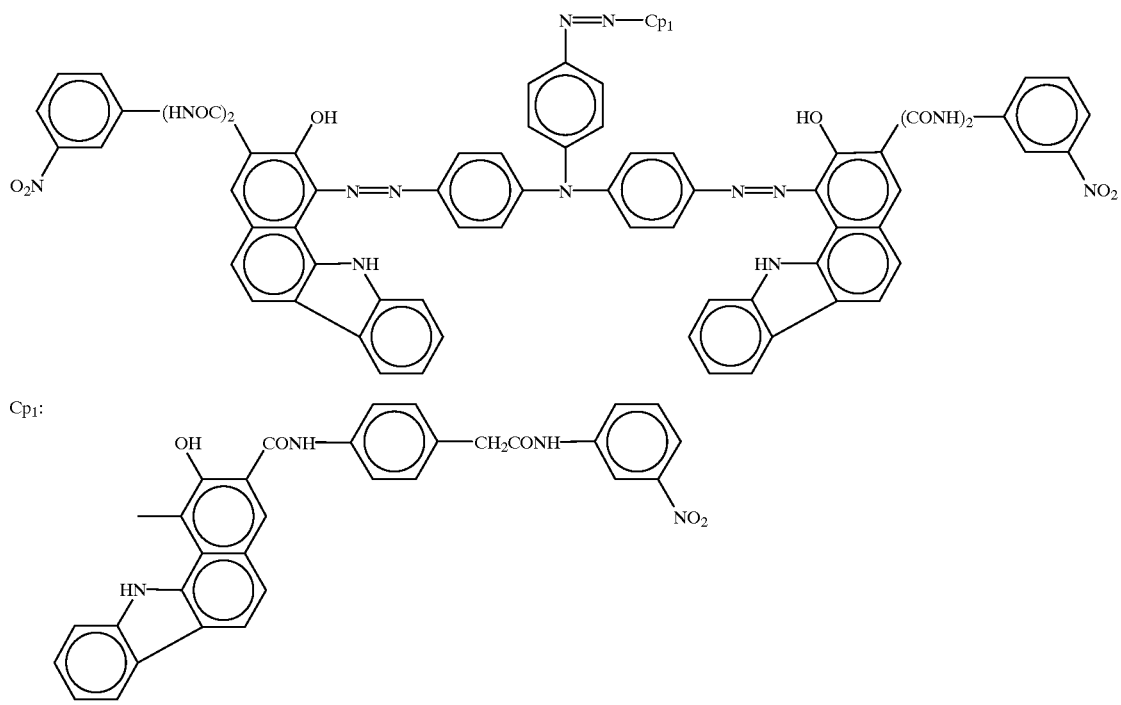

Pigment (3)-9
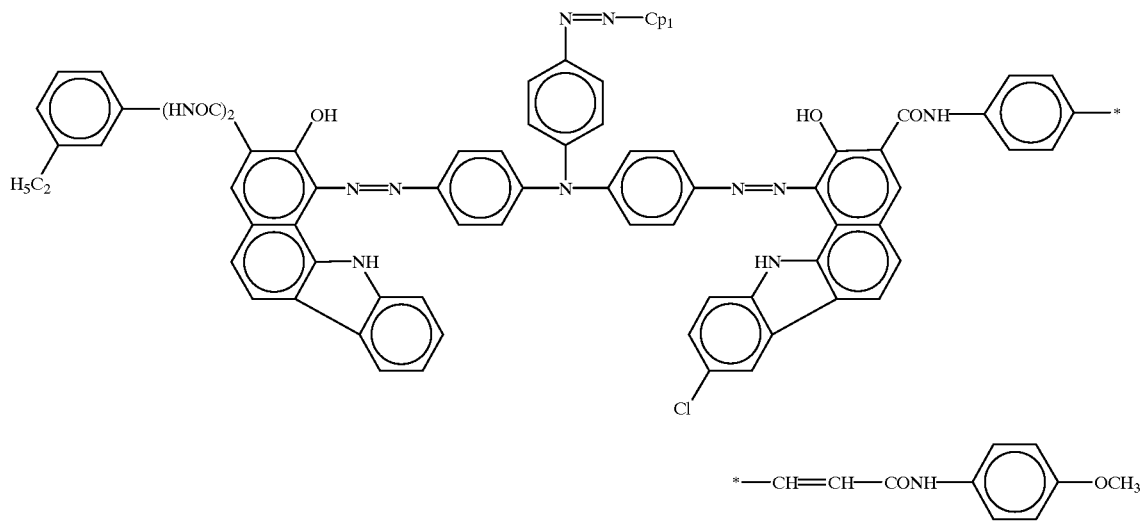
Cp₁:
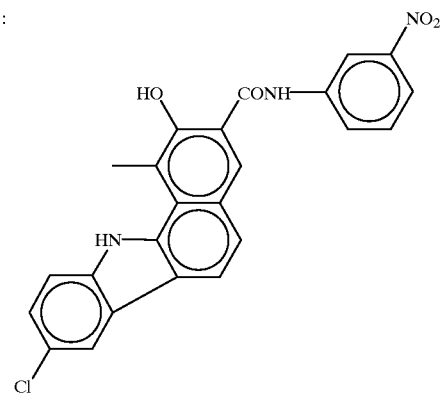
Pigment (4)-1
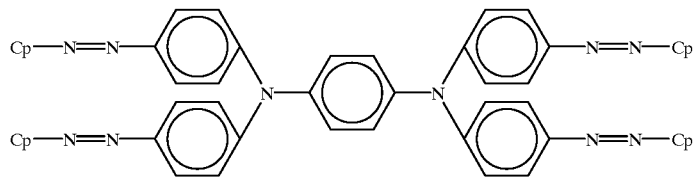
Cp:
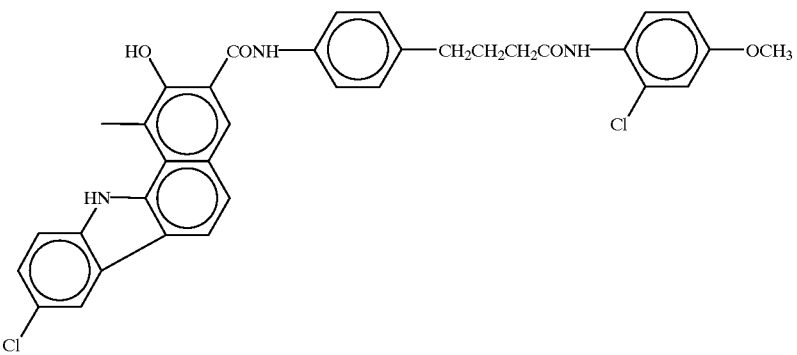

-continued
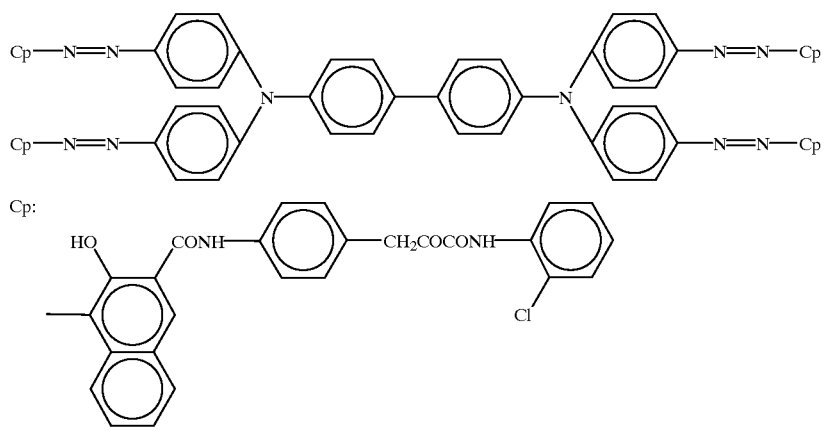
Pigment (4)-2
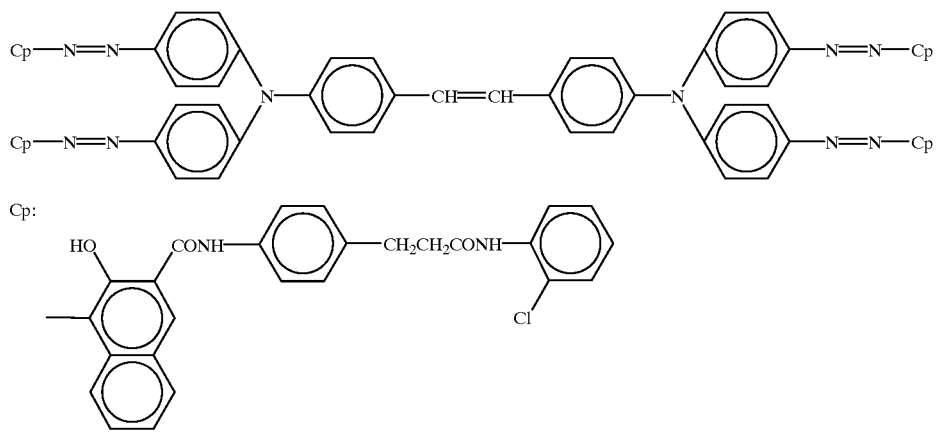
Pigment (4)-3
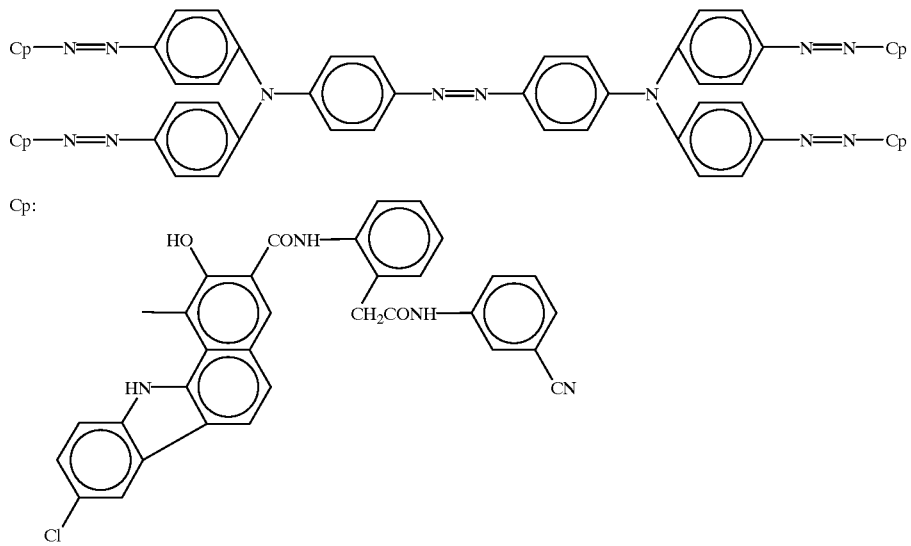
Pigment (4)-4
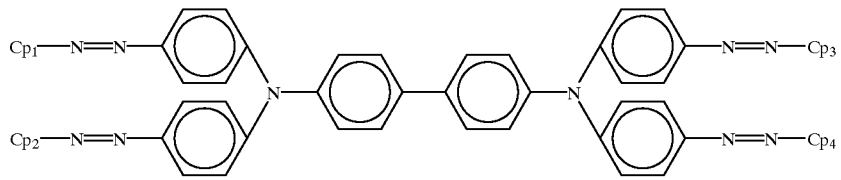
Pigment (4)-5

UNITED STATES PATENT AND TRADEMARK OFFICE
CERTIFICATE OF CORRECTION

PATENT NO. : 6,139,997
DATED : October 31, 2000
INVENTOR(S) : Masato Tanaka, et al.

It is certified that error appears in the above-identified patent and that said Letters Patent is hereby corrected as shown below:

<u>Title page,</u>
Item [57], Abstract,
Line 14, "Ar(N=N-Cp) 1-4," should read --Ar(N=N-Cp) 1-4,--.

<u>Column 1,</u>
Line 30, "of" should read -- of a --.

<u>Column 5,</u>
Line 34, "Ar(N=N-Cp)$_n$ ...(2)," should read --Ar(N=N-Cp)$_n$ ...(2),--.

<u>Column 119,</u>
Line 54, "Ar(NH$_2$)$_n$ ...(23)" should read --Ar(NH$_2$)$_n$ ...(23)--.

<u>Column 120,</u>
Line 18, "(H$_3$COCHN)$_{m1}$Ar(NH$_2$)$_{m2}$" should read --(H$_3$COCHN)$_{m1}$Ar(NH$_2$)$_{m2}$--.

<u>Column 136,</u>
Line 48, "(10)-i," should read -- (10)-1, --.

<u>Column 142,</u>
Line 45, "Ar(N=N-Cp)$_n$ ...(2)," should read --Ar(N=N-Cp)$_n$ ...(2),--.

Signed and Sealed this

Twenty-third Day of October, 2001

Attest:

NICHOLAS P. GODICI
Attesting Officer  Acting Director of the United States Patent and Trademark Office